(12) United States Patent
Ito et al.

(10) Patent No.: US 7,730,770 B2
(45) Date of Patent: Jun. 8, 2010

(54) SCANNING PROBE MICROSCOPE

(75) Inventors: Takeshi Ito, Kyoto (JP); Masahiro Ota, Kyoto (JP)

(73) Assignee: Shimadzu Corporation, Kyoto-shi (JP)

( * ) Notice: Subject to any disclaimer, the term of this patent is extended or adjusted under 35 U.S.C. 154(b) by 251 days.

(21) Appl. No.: 11/976,500

(22) Filed: Oct. 25, 2007

(65) Prior Publication Data
US 2008/0110248 A1    May 15, 2008

(30) Foreign Application Priority Data
Nov. 10, 2006    (JP) .............................. 2006-304643

(51) Int. Cl.
*G01B 5/28*    (2006.01)
(52) U.S. Cl. ........................................................ 73/105
(58) Field of Classification Search ..................... 73/105
See application file for complete search history.

(56) References Cited

U.S. PATENT DOCUMENTS

| 5,267,471 | A | * | 12/1993 | Abraham et al. | ............... | 73/105 |
| 6,006,595 | A | * | 12/1999 | Kitamura | ..................... | 73/105 |
| 6,249,000 | B1 | * | 6/2001 | Muramatsu et al. | ............ | 850/7 |
| 6,675,637 | B2 | * | 1/2004 | Saito | ........................... | 73/104 |
| 6,945,099 | B1 | * | 9/2005 | Su et al. | ....................... | 73/105 |

* cited by examiner

*Primary Examiner*—Daniel S Larkin
(74) *Attorney, Agent, or Firm*—Manabu Kanesaka

(57) ABSTRACT

A scanning probe microscope scans the surface of a sample while making a cantilever to which an exploratory needle is attached oscillate near its resonance point, and collects information on the surface of the sample based on the change of oscillation due to the interaction between the surface of the sample and the exploratory needle. The scanning probe microscope includes a plurality of oscillators attached to the cantilever for oscillating the cantilever, and an oscillator drive device connected to the oscillators for selectively applying an alternating voltage for excitation to the plurality of oscillators.

7 Claims, 3 Drawing Sheets

SCANNING PROBE MICROSCOPE

BACKGROUND OF THE INVENTION AND RELATED ART STATEMENT

The present invention relates to a scanning probe microscope, and more specifically, relates to a scanning probe microscope which scans the surface of a sample and makes a measurement while oscillating a cantilever to which an exploratory needle is attached near its resonance point.

In order to observe the surface or make a measurement of the surface roughness of metal, semiconductor material, ceramic and synthetic resin, a scanning probe microscope (SPM) as the representative of an atomic force microscope (AFM) which makes the measurement of an atomic force generated between the exploratory needle (probe) and the surface of the sample, is widely known. In the atomic force microscope, several measurement modes are used. However, recently, means called a non-contact mode or dynamic mode which makes the cantilever to which the exploratory needle is attached oscillate near the resonance point, converts and detects an interaction between the cantilever in the oscillated state and the surface of the sample applying to the exploratory needle into change in oscillation amplitude, phase, or frequency of the cantilever, is largely used (for example, refer to Japanese Patent Publication (TOKKAI) No. H11-2637 (paragraph 0003-0004).

FIG. 5 is a principled configuration diagram of the detecting portion of the atomic force microscope which is conventionally well-known. At the distal end of a cantilever 10, a sharp exploratory needle 11 is attached, and a basal portion 12 of the cantilever 10 is fixed to a pedestal 14 wherein a ceramic piezoelectric element 13 is mounted. The piezoelectric element 13 or pedestal 14 is held by a cantilever holder (not shown), and the cantilever holder is fixed to the device (microscope). The piezoelectric element 13 changes its shape in its thickness direction (up-and-down direction in FIG. 5) by the voltage which will be applied, so that when the alternating voltage with a predetermined frequency f is applied from a drive portion 15, the cantilever 10 moves up and down by the oscillation of the piezoelectric element 13. In the above-mentioned non-contact mode or dynamic mode, the frequency f of the alternating voltage is set near a mechanical resonance point of the cantilever 10. Herewith, in the cantilever 10, oscillation with amplitude larger than the oscillation amplitude of the piezoelectric element 13 itself is induced. Incidentally, displacement of the cantilever 10 is detected by an optical detection mechanism (not shown).

At this point, the displacement magnitude of the piezoelectric element 13 depends on the material or shape of the piezoelectric element 13 besides the amplitude of the alternating voltage which will be applied. Also, the oscillation amplitude of the cantilever 10 changes according to the spring constant which depends on the material or shape of the cantilever 10, condition of contact between the basal portion 12 of the cantilever 10 and the pedestal 14 besides the displacement magnitude of the piezoelectric element 13. Even if it is the same type of cantilever 10, since the individual difference of the spring constant is measurable, when the alternating voltage with the same amplitude is applied, a relatively large difference in the oscillation amplitude of the cantilever 10 may be observed.

In the atomic force microscope, the amplitude of the cantilever 10 is one of the important measurement parameters, and according to the material or shape of a sample S to be observed, an operator is required to adjust the amplitude of applied voltage so as to gain an appropriate amplitude. However, even if the voltage applied to the piezoelectric element 13 is the same, if the type or shape of the cantilever 10 differs as mentioned above, the oscillation amplitude also differs. As a result, in the case wherein the cantilever 10 which is difficult to be oscillated is used, even if the maximum voltage is applied to the piezoelectric element 13, the amplitude suitable for the most appropriate observation condition may not be achieved. On the other hand, when the cantilever 10 which is easily oscillated is used, even if the minimum voltage which can be stably-generated at the drive portion 15 is applied to the piezoelectric element 13, the amplitude of the cantilever 10 may become larger than the amplitude suitable for the most appropriate observation condition. More specifically, in the conventional scanning probe microscope, since the dynamic range of the adjustment of the oscillation amplitude of the cantilever 10 is narrow, there may be a case wherein the measurement cannot necessarily be performed on the most appropriate condition. Accordingly, this may contribute to, for example, deterioration of accuracy of an observation image.

This invention is made in order to solve the above-mentioned problems, and the main purpose of the invention is to provide a scanning probe microscope which can enlarge the dynamic range of the adjustment of oscillation amplitude of the cantilever when the cantilever is oscillated at a frequency near its resonance point.

Further objects and advantages of the invention will be apparent from the following description of the invention.

SUMMARY OF THE INVENTION

The first aspect of the invention to solve the above-mentioned problems is made by a scanning probe microscope which scans the surface of a sample while making a cantilever to which an exploratory needle is attached oscillate near its resonance point, and collects information on the surface of the sample based on change of oscillation due to the interaction between the surface of the sample and the exploratory needle. The scanning probe microscope includes:

a) a plurality of oscillators for making the cantilever oscillate; and b) an oscillator drive means wherein alternating voltage for excitation is respectively applied independently relative to the plurality of oscillators. By selection or combination of the plurality of oscillators, the oscillation amplitude of the cantilever can be adjusted.

The second aspect of the invention made in order to solve the above-mentioned problems resides in the scanning probe microscope which scans the surface of the sample while making the cantilever to which the exploratory needle is attached oscillate near the resonance point, and collects the information on the surface of the sample based on the change of the oscillation due to the interaction between the surface of the sample and the exploratory needle. The scanning probe microscope includes:

a) the plurality of oscillators provided so that the distances of the oscillators from the cantilever are different from each other in order to make the cantilever oscillate; and b) the oscillator drive means wherein the alternating voltage for excitation is selectively applied relative to the plurality of oscillators.

The third aspect of the invention to solve the above-mentioned problems resides in the scanning probe microscope which scans the surface of the sample while making the cantilever to which the exploratory needle is attached oscillate near the resonance point, and collects the information on the surface of the sample based on the change of oscillation due to the interaction between the surface of the sample and the exploratory needle. The scanning probe microscope includes:

a) the oscillator for making the cantilever oscillate; and b) the oscillator drive means wherein the alternating voltage for excitation with a predetermined frequency is applied to one of electrodes of the oscillator, and the alternating voltage with the same frequency as the alternating voltage described above and an adjustable phase is applied to the other electrode of the oscillator.

In the scanning probe microscope according to the first to third aspects of the invention, the oscillator can be typically a piezoelectric element (piezo element).

In the scanning probe microscope according to the first aspect of the invention, the plurality of oscillators with the same or different oscillation property (piezoelectric constant when the oscillator is the piezoelectric element) is overlapped in an oscillation direction, and independently provided to be able to be driven. The plurality of oscillators is preferred to have at least one different oscillation property. For example, in a piezoelectric element with a small piezoelectric constant, the oscillation amplitude when the alternating voltage with the same amplitude is applied is smaller than a piezoelectric element with a large piezoelectric constant. Therefore, when the oscillation of the cantilever is desired to be controlled to become very minute depending on the sample, type of the cantilever, or measurement purpose, the piezoelectric element with the small piezoelectric constant is selected, and the alternating voltage for excitation is applied to this piezoelectric element by the oscillator drive means. Herewith, the amplitude of the piezoelectric element can be minimized while a certain level of large voltage is being applied. On the other hand, when the cantilever is desired to be oscillated widely, the piezoelectric element with the large piezoelectric constant is selected, or the plurality of piezoelectric elements is simultaneously selected, and the alternating voltage for excitation is applied by the oscillator drive means. Herewith, a wide oscillation amplitude can be obtained.

As stated above, according to the scanning probe microscope in the first aspect of the invention, since the dynamic range of the control of the oscillation amplitude of the cantilever can be widened, various types or shapes of cantilevers can be oscillated respectively with the most appropriate amplitude. Herewith, for example, the accuracy (resolution) of the observation image of the surface of the sample can be improved. Also, the measurement of various samples can be performed by one microscope. In addition, when the oscillation amplitude is desired to be measured by the same cantilever while changing the condition from the small amplitude to the large amplitude, conventionally, the cantilever is required to be exchanged to another cantilever holder. However, according to the scanning probe microscope of the first invention, since only one cantilever holder can cover from the small amplitude to the large amplitude, the cantilever holder is not required to be exchanged. Accordingly, the scanning probe microscope has the advantage that the surface of the sample can be observed excellently since there is no misalignment of vision for the sample due to the exchange of the cantilever, as well as the advantage of being efficient because of omission of the changing.

In the scanning probe microscope according to the second aspect of the invention, as a plurality of oscillators, for example, the piezoelectric elements are arranged so that the distances of the piezoelectric elements from the cantilever are different from each other, and the oscillation due to the distant piezoelectric elements has large attenuation before the oscillation reaches the cantilever. More specifically, since the piezoelectric elements provided in a position far from the cantilever effectively function in a similar manner to the piezoelectric elements with the small piezoelectric constant, as in the case of the first aspect, by selectively driving the piezoelectric elements, a similar operation and effect to the first aspect of the invention can be obtained.

In the scanning probe microscope according to the third aspect of the invention, the phase difference of the alternating voltage which is applied to two electrodes of the piezoelectric elements can be adjusted. Since the piezoelectric elements are oscillated by the difference of the voltage applied to the two electrodes, while the frequency, amplitude, and phase of the alternating voltage applied to one of the electrodes remain fixed, only the phase of the alternating voltage with the same frequency and same amplitude applied to the other electrode is changed. As a result, when the phase becomes a reverse polarity, the oscillation amplitude of the piezoelectric elements is maximized, so that as the phase is shifted, the oscillation amplitude is minimized. Therefore, in addition to the oscillation amplitude of the piezoelectric elements being adjusted by changing the amplitude of the alternating voltage as in a conventional manner, the oscillation amplitude of the piezoelectric elements is adjusted by the above-mentioned phase control. Accordingly, the dynamic range of the control of the oscillation amplitude of the cantilever can be expanded. Herewith, the same operation and effect as in the case of the first and second aspects of the invention can be obtained. In addition, in the scanning probe microscope according to the third aspect, only the circuit of the drive means which applies the alternating voltage for excitation may be changed by using the conventional cantilever holder as-is, so that the scanning probe microscope can be introduced to an existing device at a relatively low cost.

DETAILED DESCRIPTION OF PREFERRED EMBODIMENTS

First Embodiment

Figure 1:
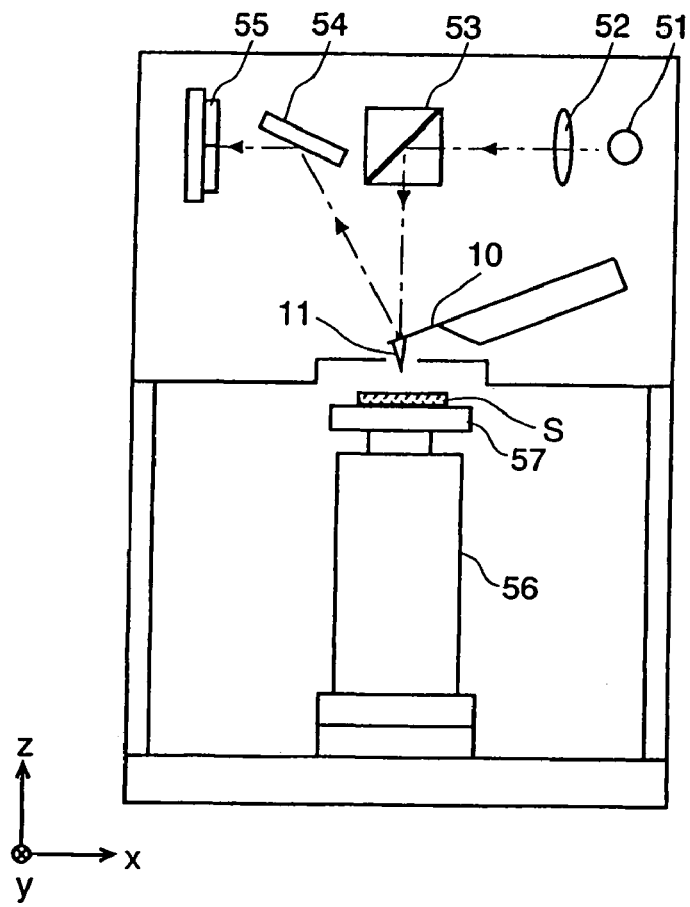
FIG. 1 is a schematic structural view of an overall detecting portion of a scanning probe microscope according to a first embodiment.

First, the scanning probe microscope of an embodiment (first embodiment) of the first aspect of the invention will be specifically explained with reference to the attached drawings. FIG. 1 is a schematic structural view of an overall detecting portion of the scanning probe microscope according to the first embodiment.

As shown in FIG. 1, a sample S which is an observation object is retained on a sample support 57 provided on a scanner 56 having a roughly tubular shape. The scanner 56 includes a piezoelectric element, scans the sample S in a biaxial direction of x and y by a voltage applied from outside, and gives the micro motion of the sample S in a z axis direction. Above the sample S, a cantilever 10 including an exploratory needle 11 is arranged at its tip, and the cantilever 10 is oscillated by an excitation portion including the piezoelectric element hereinafter described.

In order to detect the phase of the cantilever 10, a laser light source 51, lens 52, beam splitter 53, mirror 54, and light detector 55 are provided. More specifically, after a laser light beamed from the laser light source 51 is converged at the lens 52, the laser light is reflected at the beam splitter 53, and illuminated near the tip of the cantilever 10. The reflected light is detected at the light detector 55 through the mirror 54. The light detector 55 includes light acceptance surfaces broken into several pieces (usually, two) in a displacement direction (z axis direction) of the cantilever 10. Therefore, when the cantilever 10 is displaced upward and downward, the proportion of the amount of incoming light on a plurality of acceptance surfaces changes, so that by computing a detection signal responding to the amount of a plurality of light received, the amount of displacement of the cantilever 10 can be calculated.

The measurement operation at the non-contact mode of the scanning probe microscope with the above-mentioned structure will be briefly explained. The cantilever 10 is oscillated in the z axis direction with a frequency f near its resonance point by the after-mentioned excitation portion, and when gravity (or repulsive force) is applied between the exploratory needle 11 and the surface of the sample S, the oscillation amplitude of the cantilever 10 changes. By the detection signal of the light detector 55, the amount of minute change of the oscillation amplitude is detected, and the amount of change is zeroed. More specifically, the piezoelectric element in the z axis direction of the scanner 56 is given feedback control in such a way as to maintain the oscillation amplitude constantly. In that state, when the sample S is scanned by controlling the piezoelectric element in an x axis to y axis direction of the scanner 56, the amount of the above-mentioned feedback control corresponds to microasperity of the surface of the sample S, so that a surface image of the sample S can be created.

Figure 2:
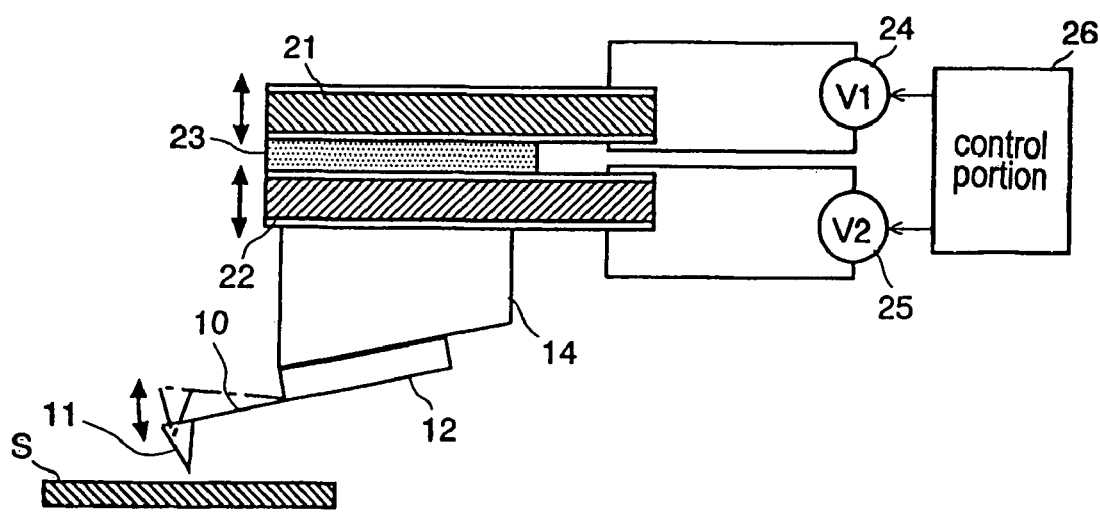
FIG. 2 is a detailed drawing of an excitation portion of a cantilever in the scanning probe microscope of the first embodiment.

Next, the structure of the excitation portion which is characteristic in the scanning probe microscope of the present embodiment will be explained with reference to FIG. 2. FIG. 2 is a detailed drawing of the excitation portion of the cantilever, and the same symbols are assigned to the same structural element shown in FIG. 5, and their explanations are omitted.

In this embodiment, an oscillator oscillating the cantilever 10 through a pedestal 14 comprises a first piezoelectric element 21 and a second piezoelectric element 22 overlapped in an oscillation direction and sandwiching a plate-like insulating material 23. Here, the first piezoelectric element 21 and the second piezoelectric element 22 have a different piezoelectric constant, and larger piezoelectric constant of the first piezoelectric element 21 than that of the second piezoelectric element 22 is selected. Also, in each piezoelectric element 21, 22, a first drive portion 24 and second drive portion 25 which can respectively apply alternating voltage independently, are provided, and controlled by a control portion 26.

Now, when the cantilever 10 is oscillated using the first piezoelectric element 21, it assumes that the oscillation amplitude of the cantilever 10 is 100 nm relative to a voltage signal 10 mV of the alternating voltage. In this amplitude, since the force provided to the sample S is too large, in such a case wherein there is a high probability of damage to the sample S, observation by reducing the oscillation amplitude is required. If the oscillation amplitude of the cantilever 10 required at this time is, for example, 10 nm, in order to reach to the oscillation amplitude by using the first piezoelectric element 21, the voltage signal is required to be set to 1 mV. However, if the voltage signal is set below 10 mV, generally, the noise level of the drive portion and signal strength become comparable, so that the piezoelectric element cannot be stably driven. Consequently, when the above-mentioned minute oscillation amplitude is required, the second piezoelectric element 22 with a small number of piezoelectric constant is used.

For example, when the oscillation amplitude of the cantilever 10 is 5 nm relative to the second piezoelectric element 22 with the voltage signal 10 mV, the voltage signal necessary for the oscillation amplitude of the cantilever 10 to be 10 nm, becomes 20 mV. Herewith, since the signal strength is sufficiently larger than the noise level, the piezoelectric element can be stably driven. More specifically, in the case wherein the oscillation amplitude of the cantilever 10 is desired to be smaller due to the type of the sample S, type (differences of property such as the spring constant, shape, or size and so on) of the cantilever 10 itself, or measurement purpose, the alternating voltage with a predetermined frequency and amplitude may be applied to the second piezoelectric element 22 by the second drive portion 25 in such a way as to utilize the second piezoelectric element 22 with a small number of piezoelectric constant for excitation.

Conversely, in the case wherein the oscillation amplitude of the cantilever 10 is desired to be larger, the alternating voltage with the predetermined frequency and amplitude may be applied to the first piezoelectric element 21 by the first drive portion 24 in such a way as to utilize the first piezoelectric element 21 with a large number of piezoelectric constant for the excitation. Moreover, by applying the alternating voltage from both first and second drive portions 24, 25 in such a way as to simultaneously oscillate the first and second piezoelectric elements 21, 22 with the same frequency and same phase, the maximum oscillation amplitude can be obtained in the scanning probe microscope. Therefore, according to the scanning probe microscope of this embodiment, the dynamic range of the oscillation amplitude of the cantilever 10 can be expanded more than the conventional way to obtain the stable excitation.

Incidentally, the control portion 26 may change the control of the drive portions 24, 25 according to the operation which was performed at an operating portion (not shown) by an operator. However, otherwise the following structure may be used. For example, the type of the cantilever 10 attached to the pedestal 14 and so on is automatically determined, and based on the determined result, the piezoelectric elements 21, 22 automatically utilizing for the excitation are selected, so that the drive portions 24, 25 are controlled.

Second Embodiment

Figure 3:
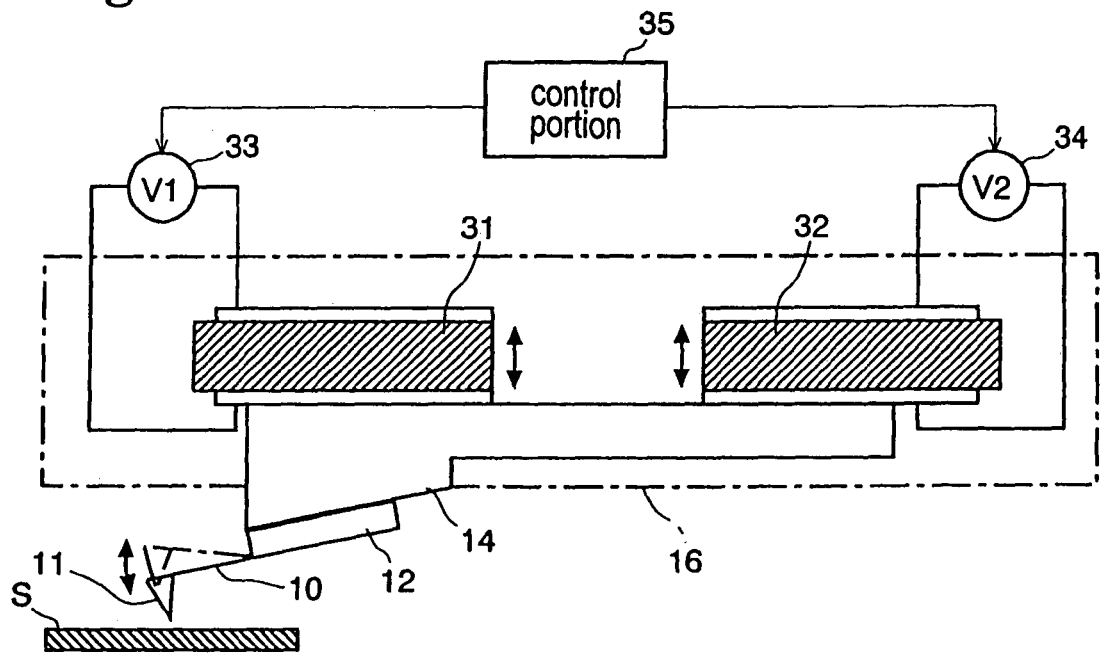
FIG. 3 is a detailed drawing of the excitation portion of the cantilever in the scanning probe microscope of a second embodiment.

Next, in the scanning probe microscope of an embodiment (second embodiment) of the second aspect of the invention, the characteristic structure of the excitation portion will be explained with reference to FIG. 3. FIG. 3 is a detailed drawing of the excitation portion of the cantilever, and the same symbols are assigned to the same structural elements shown in FIGS. 2, 5, and their explanations are omitted.

In the pedestal 14 wherein a basal portion 12 of the cantilever 10 is fixed, a first piezoelectric element 31 is provided in a position close to the basal portion 12, and a second piezoelectric element 32 is provided in a position away from the basal portion 12. These piezoelectric elements 31, 32 or the pedestal 14 are held by a cantilever holder 16. Here, the first and second piezoelectric elements 31, 32 have the same piezoelectric constant; however they may have different piezoelectric constants. Also, in the respective piezoelectric elements 31, 32, a first drive 33 and second drive 34 which can respectively apply alternating voltage independently, are provided, and controlled by a control portion 35.

When the first and second piezoelectric elements 31, 32 are oscillated, both oscillations are transmitted through the pedestal 14 and reach the basal portion 12 of the cantilever 10. While the oscillations transmit through the pedestal 14, the oscillation amplitude attenuates, so that even if oscillation amplitudes of the original piezoelectric elements 31, 32 themselves are the same, the further the distance from the basal portion 12 goes, the oscillation amplitude of the cantilever 10 becomes smaller. Therefore, the second piezoelectric element 32 corresponds to the second piezoelectric element 22 which has a smaller piezoelectric constant in the first embodiment, and as in the case of the first embodiment, the dynamic range of the oscillation amplitude of the cantilever 10 can be expanded by selectively driving the first and second piezoelectric elements 31, 32.

Third Embodiment

Figure 4:
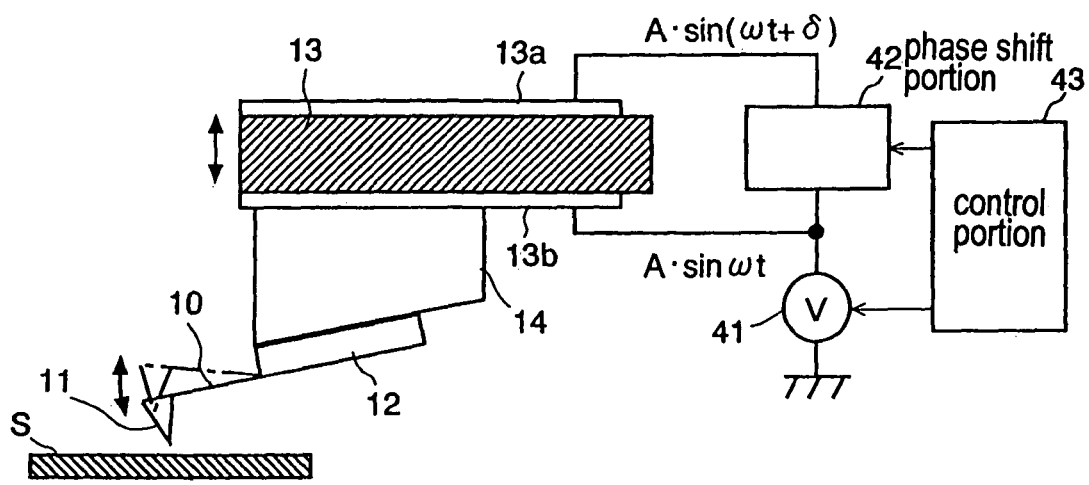
FIG. 4 is a detailed drawing of the excitation portion of the cantilever in the scanning probe microscope of a third embodiment.

Next, in the scanning probe microscope of an embodiment (third embodiment) of the third aspect of the invention, the characteristic structure of the excitation portion will be explained with reference to FIG. 4. FIG. 4 is a detailed drawing of the excitation portion of the cantilever, and the same symbols are assigned to the same structural elements shown in FIGS. 2, 3, 5, and their explanations are omitted.

Figure 5:
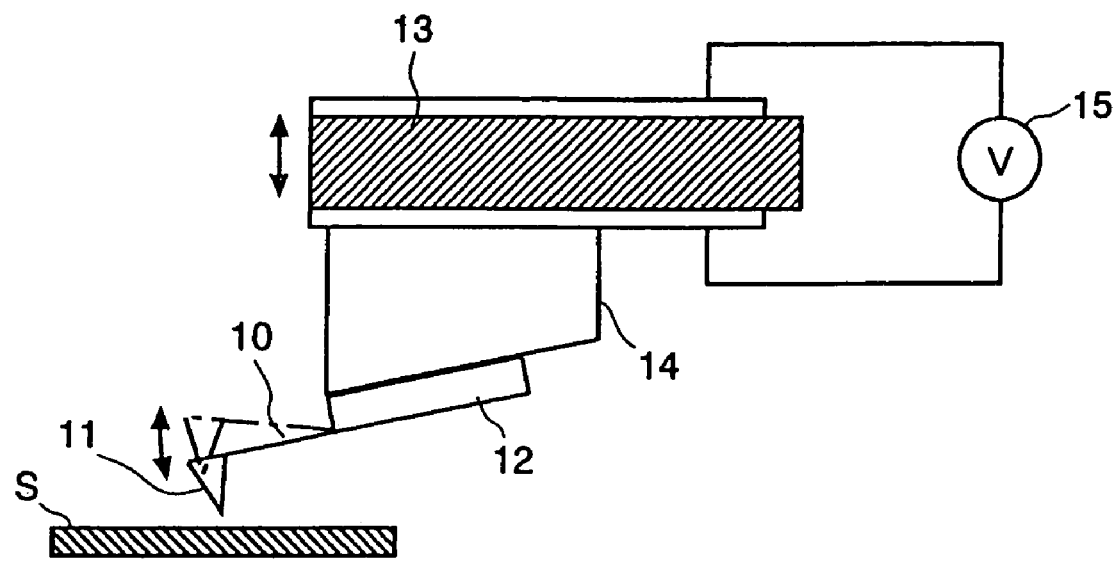
FIG. 5 is a detailed drawing of the excitation portion of the cantilever in a conventional scanning probe microscope.

In the scanning probe microscope according to the third embodiment, the structure itself of the piezoelectric element is the same as the conventional one as explained in FIG. 5; however, the drive portion driving the piezoelectric element has specific features. More specifically, in an electrode 13b of one side of a piezoelectric element 13, an alternating voltage $A \cdot \sin \omega t$ which is generated at a voltage source portion 41 is applied. In an electrode 13a of the other side of the piezoelectric element 13, an alternating voltage $A \cdot \sin(\omega t + \delta)$ wherein the phase of the alternating voltage $A \cdot \sin \omega t$ is shifted for only $\delta$ by a phase shift portion 42, is applied. A control portion 43 controls the amplitude A and the frequency $\omega t$ of the alternating voltage relative to the voltage source portion 41, and the phase shift amount $\delta$ is controlled relative to the phase shift portion 42.

The piezoelectric element 13 oscillates by the differences of the alternating voltages provided to the two electrodes 13a, 13b. Conventionally, as shown in FIG. 5, the electrodes 13a, 13b are connected, so that just reversed-phase voltage is applied between the electrodes 13a, 13b, and therein the oscillation amplitude is maximized. When the voltage is applied as mentioned above, the difference is $$A \cdot \sin(\omega t + \delta) - A \cdot \sin(\omega t) = -2A \cdot \sin(\delta/2) \cdot \cos(\omega t + \delta/2) \quad (1)$$

Formula (I) shows that the oscillation amplitude can be controlled by controlling the phase $\delta$.

Consequently, for example, under the control of the control portion 43, the voltage source portion 41 outputs the alternating voltage with the amplitude A which has the appropriate size of the extent of having high tolerance for noise, and the shift amount $\delta$ is controlled at the phase shift portion 42 by reducing or increasing $\pi$. Accordingly, the effective oscillation amplitude of the piezoelectric element 13 can be further reduced from the amplitude corresponding to the amplitude A of the alternating voltage. Herewith, as in the case of the first and second embodiments, the dynamic range of the oscillation amplitude of the cantilever 10 can be expanded.

Incidentally, the structures of the excitation portion explained in the first to third embodiments can be used as a combination, so that much further expansion of the dynamic range of the oscillation amplitude can be possible. Also, since each of the above-mentioned embodiments is an example of the invention, it is apparent that even if the embodiments are modified, changed, added and so on within an appropriate range of the effect of the invention even in the further point other than the point described in the above, the embodiments are included in a range of claims of the invention. For example, in the first and second embodiments, only two piezoelectric elements are provided; however, they may be three or more. Also, in the case wherein only one of a plurality of piezoelectric elements is selectively used (a plurality of piezoelectric elements is not driven simultaneously), the drive portion may be only one so as to switch the piezoelectric elements applying the alternating voltage by a switch and so on.

The disclosure of Japanese Patent Application No. 2006-304643, filed on Nov. 10, 2006, is incorporated in the application.

While the invention has been explained with reference to the specific embodiments of the invention, the explanation is illustrative and the invention is limited only by the appended claims.

What is claimed is:

1. A scanning probe microscope for scanning a surface of a sample and collecting information on the surface of the sample based on a change of oscillation, comprising:
   a cantilever having an exploratory needle;
   a plurality of oscillators attached to the cantilever for oscillating the cantilever; and
   an oscillator drive device connected to the oscillators for selectively applying an alternating voltage for exciting the plurality of oscillators,
   wherein said plurality of oscillators are arranged so that distances of said plurality of oscillators relative to the cantilever are different.

2. A scanning probe microscope according to claim 1, wherein said oscillator drive device independently applies the alternating voltage to the plurality of oscillators, an oscillation amplitude of the cantilever being adjusted by selection or combination of the plurality of oscillators.

3. A scanning probe microscope according to claim 2, wherein said plurality of oscillators is arranged vertically with an insulating material therebetween.

4. A scanning probe microscope according to claim 1, wherein said plurality of oscillators has different oscillation properties.

5. A scanning probe microscope according to claim 1, wherein said cantilever is configured to oscillate near its resonance point to collect information on the surface of the sample based on a change of oscillation due to an interaction between the surface of the sample and the exploratory needle.

6. A scanning probe microscope according to claim 5, further comprising a pedestal situated between the cantilever and the plurality of oscillators.

7. A scanning probe microscope for scanning a surface of a sample and collecting information on the surface of the sample based on a change of oscillation, comprising:
 a cantilever having an exploratory needle;
 an oscillator attached to the cantilever for oscillating the cantilever and having two electrodes; and
 an oscillator drive device connected to the electrodes of the oscillator, said oscillator drive device applying an alternating voltage for exciting with a predetermined frequency one of the electrodes, and an alternating voltage with a same frequency as the alternating voltage and an adjustable phase to the other electrode.

* * * * *